United States Patent [19]

Günkel et al.

[11] Patent Number: 4,701,878
[45] Date of Patent: Oct. 20, 1987

[54] APPARATUS FOR ASSIGNING ADDRESSES TO PLUGGABLE MODULES BASED ON CONTACT CONFIGURATION

[75] Inventors: Hans-Dieter Günkel, Erlangen; Josef Röhrle, Hessdorf, both of Fed. Rep. of Germany

[73] Assignee: Siemens Aktiengesellschaft, Munich, Fed. Rep. of Germany

[21] Appl. No.: 681,184

[22] Filed: Dec. 13, 1984

[30] Foreign Application Priority Data

Dec. 28, 1983 [DE] Fed. Rep. of Germany ....... 3347357

[51] Int. Cl.⁴ .................... G06F 12/00; G06F 13/00
[52] U.S. Cl. .................................................. 364/900
[58] Field of Search ... 364/200 MS File, 900 MS File; 365/230; 339/184 M, 186 M

[56] References Cited

U.S. PATENT DOCUMENTS

| | | | |
|---|---|---|---|
| 3,729,657 | 4/1973 | Callan | 339/186 M |
| 4,025,903 | 5/1977 | Kaufman | 364/200 |
| 4,303,993 | 12/1981 | Panepinto | 364/200 |
| 4,454,596 | 6/1984 | Wunsch | 364/900 |
| 4,478,469 | 10/1984 | Waite | 339/186 |
| 4,562,535 | 12/1985 | Vincent | 364/200 |
| 4,571,676 | 2/1986 | Mantellina | 364/200 |
| 4,579,412 | 4/1986 | Czeschka | 339/186 M |
| 4,589,063 | 5/1986 | Shah | 364/200 |

OTHER PUBLICATIONS

IBM Technical Disclosure Bulletin, vol. 18, No. 3, Aug. 1975, "Basic Storage Module Selection Check" by Annunziata, et al.

*Primary Examiner*—David Y. Eng
*Assistant Examiner*—Lawrence E. Anderson
*Attorney, Agent, or Firm*—Kenyon & Kenyon

[57] ABSTRACT

In order to feed to pluggable electronic modules addresses for an address-controlled data exchange with a control unit, a module code characterizing the type of module is stored in each module in a first memory. A plug location code is further communicated to each module via a transmitter. During an initialization phase, all modules are addressed via the plug location codes and communicate to the control unit their respective module codes. The control unit thereupon communicates the relevant addresses to the modules by addressing the plug location codes, which then are used for further data exchange. The relevant address for each module is stored in a second memory of each module.

6 Claims, 2 Drawing Figures

APPARATUS FOR ASSIGNING ADDRESSES TO PLUGGABLE MODULES BASED ON CONTACT CONFIGURATION

BACKGROUND OF THE INVENTION

The present invention relates to apparatus for assigning addresses to pluggable modules which are provided for address-controlled data exchange with a control unit.

If a central control unit, for instance, of a machine tool control, communicates with a multiplicity of associated modules, this communication is generally address-controlled. To this end it is necessary to first assign addresses to the individual modules. In commercially available devices, this assignment is accomplished by manual intervention by inserting electrical jumpers in the individual modules or by programming read-only memories in the modules with the appropriate addresses.

SUMMARY OF THE INVENTION

It is an object of the present invention to provide an apparatus for assigning addresses to pluggable modules wherein addresses are assigned for the data exchange solely by means of the control unit and without manual intervention. It is assumed that the modules are pluggable and are arranged in a predetermined spatial order system.

The above and other objects of the present invention are acheved by the provision that a plug location code is provided for each module; that a module code giving the type of the module is impressed in a first memory of each module; that during an initializing phase, prior to the start of the data exchange proper, the respective present module codes are interrogated by the control unit by successive addressing of all possible plug location codes in that an address comparator of each module detect the concordance of the respectively called-up address with the respective plug location codes and consequently initiates the read-out of the respective module code; and that thereupon an address relevant for further data exchange is fed by the control unit, likewise by addressing the plug location codes of each module in a second memory respectively assigned thereto.

A first advantageous embodiment of the invention provides that the presence of the initializing phase can be communicated to all modules by a code signal on a control line. Such a control line can be provided especially if flat modules are provided in a flat module carrier as the modules. A special command transmission for signalling the initialization phase can then be dispensed with.

During the initialization phase, all functional elements of the modules not provided for the address assignment can be switched off so that any interference with addressing is reliably avoided.

A further advantageous embodiment of the invention provides that the respective plug location code can be communicated to the module by respective electrical code signals at predetermined ones of the contacts of an associated plug connector arranged at a module carrier for the module. This provides a convenient and easily implemented way of transmitting the plug location code.

Preferably, a non-volatile read memory is used as the first memory, as such a memory is particularly economical to use in this application.

The distinction of the initialization phase from the rest of the operation allows the plug location codes outside the initialization phase to be available as relevant addresses, so that the operationally usable address space by an address field required for the plug location codes remains unaffected.

Due to the fact that, starting from a base state of the control unit, an initialization phase can always be triggered, it is thus ensured that manual intervention into the system, for instance, the interchange of modules, does not remain undetected and possibly causes a new addressing operation.

For the data exchange itself, it is found to be advantageous if on every module, additional data such as data concerning the number of waiting cycles to be observed, the degree of completion or the state of change also can be impressed, besides the respective relevant address.

Each individual module can also be assigned not only a point-wise effective address but any desired address range, should the operation of the module make this necessary. This is found to be advantageous particularly if a multiplicity of different modules are employed.

BRIEF DESCRIPTION OF THE DRAWINGS

The present invention will be described in greater detail in the following detailed description with reference to the drawings in which.

DETAILED DESCRIPTION

Figure 1:
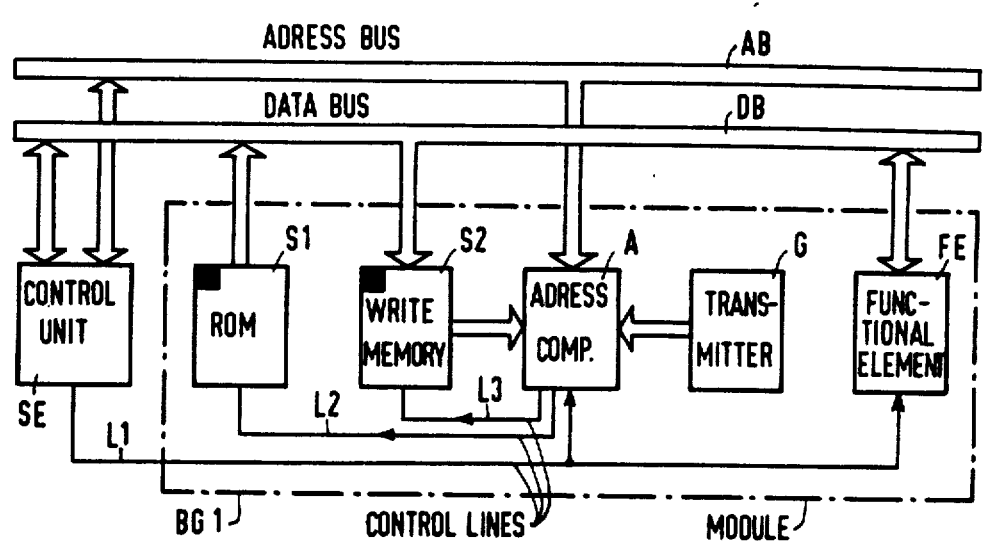
FIG. 1 is a block diagram of the present invention.

With reference now to the drawings, FIG. 1 shows a control unit SE coupled via an address bus AB and a data bus DB to a module BG1 (indicated by the dashed line). A possible further connection via a control bus is not shown for the sake of clarity. Additionally, other bus arrangements could also be used, e.g. a common address/ data bus. As will be shown in FIG. 2, a multiplicity of further modules may be provided besides the module BG1.

Each module, among others, the module BG1, contains a first memory S1, in which information regarding the type of the respective module is stored as the module code. This first memory S1 is generally designed as a non-volatile read-only memory. There is furthermore provided for each module a second memory S2 as a write memory. The module BG1 and each other module is provided with an address comparator A which is coupled to the address bus AB. The respective address present on the address bus and a plug location code respectively determined by a transmitter G, or the information stored in the memory S2 are fed to the address comparator A for the purpose of comparison. The design of the transmitter G and the provision of the plug location code as well as of the information in the second memory S2 will be further discussed in the following. The module BG1 and the other modules are further coupled to other functional elements FE of any desired kind.

If an address is to be assigned to the module BG by the control unit SE for starting a regular data exchange, this occurs during an initialization phase following a base state. To this end, a code signal is read out on a control line L1 by the control unit SE which marks the initialization phase. This code signal arrives at the address comparator A. The latter thereby compares the addresses (either as individual addresses or address spaces) read out by the control unit SE on the address bus AB during the presence of the initialization phase with the plug location code conveyed to it by the transmitter G. If the two data agree, the module code indicating the type of module is communicated from memory S1 to the control unit SE via the data bus DB. For this purpose, a corresponding code signal is fed by the address comparator A to the first memory S1 via a control line L2. The use of address spaces allows the use of addressing building blocks with relatively few terminals.

The control unit SE determines, of all possible modules, among which is the module BG1, by interrogating all possible plug location codes, the module codes in question, so that thereupon the degree of completion of the entire system is known to the control unit SE. Thereby, the control unit SE is enabled to communicate addresses or addres spaces to all modules, as required, including the module BG1. This is done again by calling up all plug location codes or, if the degree of completion is known, all plug location codes of occupied plug locations via the address bus AB. The respective selected address is then impressed via the data bus DB on the respective second memory S2 of each module, including the module BG1. To this end, an appropriate code signal is fed by the respective address control comparator A to the second memory S2 via a control line L3. After this has happened, the code signal on the control line L1 is removed and the modules, including the module BG1, are called up via an address on the address bus AB which corresponds to the respectively assigned address stored in the memory S2.

If, after a plug location code is called up, no module code is given within a predetermined time span, the control unit SE concludes therefrom that no module is assigned to this plug location. It is also possible however, that a control data word is always impressed on the data bus DB which is written-over by the respective module codes. If, after a plug location code is called up, the control data word persists, this indicates that the corresponding plug location is not occupied.

During the initialization phase every functional unit not provided for address assignment furthermore preferably is made inoperative due to the presence of the code signal on the control line L1, for instance, the functional unit FE of the module BG1.

Figure 2:
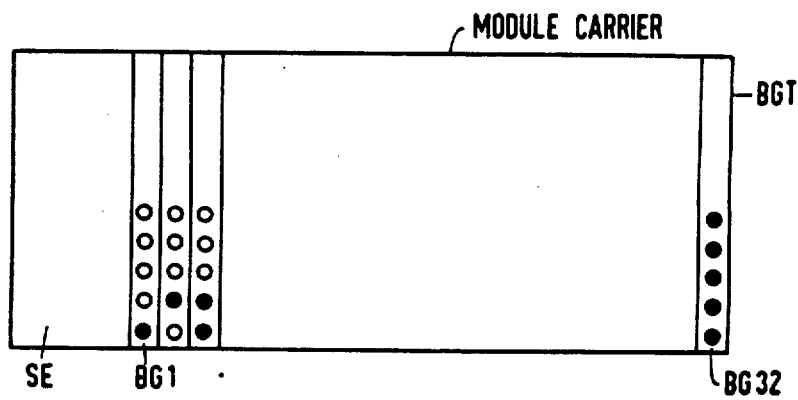
FIG. 2 shows a physical arrangement of the invention.

In FIG. 2, a physical arrangement of the modules (modules BG1-BG32 in the chosen example) in a module carrier BGT is indicated schematically. Further accommodated in the module carrier BGT, in addition to the modules BG1-BG32, is the control unit SE. It is indicated in the presentation according to FIG. 2, how the transmission of the plug location code to the individual modules BG1-BG32 taken place. To this end, electrical code signals are impressed on respectively predetermined ones of the contacts of plug connectors (not shown for the sake of clarity) of the module carrier BGT. The predetermined contacts, which therefore contain the function of the transmitter G of FIG. 1, are indicated by circles. The other contacts provided for other purposes are not shown for the sake of clarity. The respective electrical code signals are symbolized by showing every corresponding circle filled in for the state logical "1", while the respective circle is left open for the state logical "0". Thereby, the sequence of binary numbers 00001 to 11111 can be impressed on the modules BG1-BG32.

The relationship of the plug location codes to the pluggable modules can also be made in accordance with any other desired scheme. It is essential, however, that a specific plug location code is available for every plug location.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification nd drawings are, accordingly, to be regarded in an illustrative rather than a restrictive sense.

What is claimed is:

1. A circuit arrangement comprising a plurality of electronic circuit modules interconnected by bus means for communicating address, data and control information between the modules and a control unit, the modules being coupled to a module carrier by respective plug connection means, a plug location being associated with each plug connection means, said plug connection means comprising contact means for said address, data and control line information, and further having a plurality of contacts on which a pattern of logic signals is impressed, a different pattern being electrically associated with the respective plug location for each module as a plug location code, each module respectively having a first memory means wherein a module code indicating the type of module is stored, said first memory means being coupled to the bus means, each module respectively comprising an address comparator means coupled to the bus means for comparing addresses on said bus means, and supplied by said control unit, to the respective plug location code during an initialization phase controlled by said control unit, said control unit during said initialization phase sequentially interrogating each module on said bus means by consecutively supplying all possible plug location codes via said bus means, said module comprising means for providing said module code stored in said first memory means to said control unit, said control unit comprising means for determining the type of module from the module code from the first memory means present at each plug location, said control unit further comprising means for addressing each of the modules via said bus means and for providing to each module a respective further address for performing further data communications between the control unit and the modules, each module further comprising a second memory means coupled to the bus means having stored therein a further address for carrying on said further data communication between the control unit and said modules, said address comparator means comprising means responsive to a control signal on a control line coupling said control unit and each of said modules and for comparing the further addresses on said bus means with said further address in said second memory means after completion of the initialization phase, said plug location codes being available as further addresses after said initialization phase.

2. The circuit arrangement recited in claim 1, further comprising additional electronic circuit means coupled to said modules, and further comprising means for disabling said additional means during said initialization phase.

3. The circuit arrangement recited in claim 1, wherein said first memory means comprises nonvolatile read only memory means.

4. The circuit arrangement recited in claim 1, wherein said initialization phase is triggered by said control unit.

5. The circuit arrangement recited in claim 1, wherein additional data can be transmitted from said control unit and stored in each module in addition to said further addresses.

6. The circuit arrangement recited in claim 1, wherein at least one of said further addresses comprises an address space.

* * * * *